(No Model.)

W. H. DOUGLAS.
SIDE AND DECK LIGHT FOR VESSELS.

No. 354,013. Patented Dec. 7, 1886.

Witnesses
T. J. Edwards
W. E. Chaffee

Inventor
Wm. H. Douglas
Per Wm. R. Singleton
Atty.

United States Patent Office.

WILLIAM H. DOUGLAS, OF WASHINGTON, DISTRICT OF COLUMBIA.

SIDE AND DECK LIGHT FOR VESSELS.

SPECIFICATION forming part of Letters Patent No. 354,013, dated December 7, 1886.

Application filed June 25, 1886. Serial No. 206,225. (No model.)

*To all whom it may concern:*

Be it known that I, WILLIAM H. DOUGLAS, a citizen of the United States, residing at Washington city, in the District of Columbia, have invented a new and useful Improvement in Side and Deck Lights for Vessels, of which the following is a specification, reference being had to the accompanying drawings.

This invention relates to improvements in deck or side lights for vessels, which will be hereinafter more particularly described, and pointed out in the claim.

Figure 1:
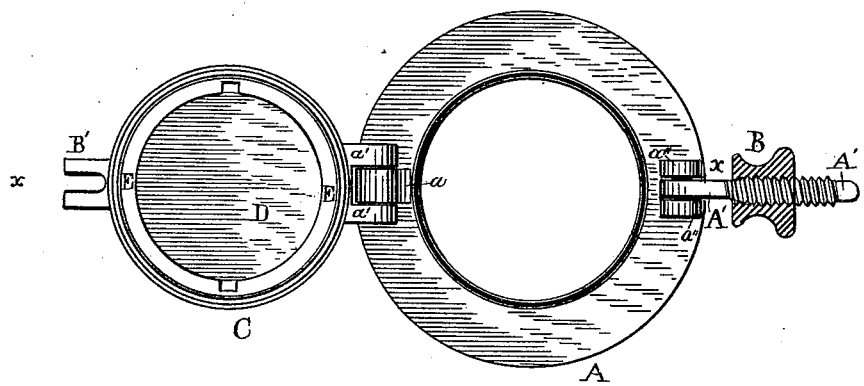
Figure 2:
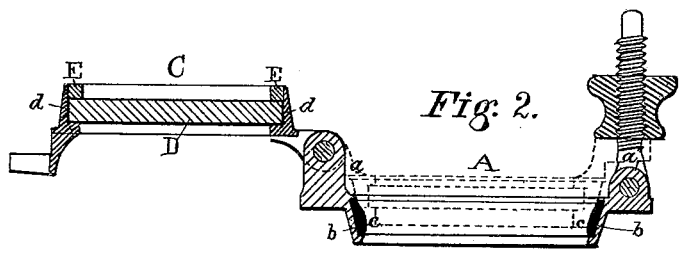
Figure 3:
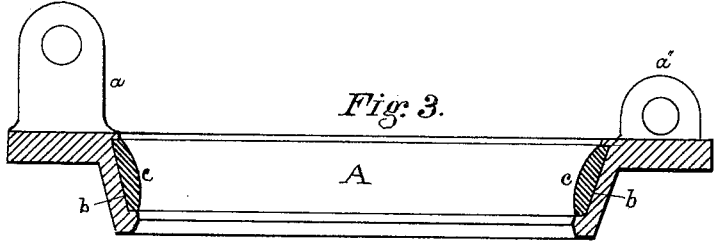

In the accompanying drawings, forming part of this specification, Figure 1 represents the side-light frame with the cover thrown open. Fig. 2 is a transverse section through the hinge-joint on the line $xx$ of Fig. 1. Fig. 3 is an enlarged view of section of the frame shown in Fig. 2.

A is the frame of the side or deck light, to be made of metal, and which is to be secured in the side or deck of the vessel in any suitable manner. On this frame A is the standard $a$, to which the jaws $a'$ $a'$ of the cover are pivoted, making a hinge-joint.

A' is the fastening screw-bolt, which is hinged to the jaws $a''$ $a''$, attached to the frame A diametrically opposite to the hinge-joint. On the screw-bolt A' is a thumb-nut, B. (Shown in section.) On the cover C is the jaw B', into which the screw-bolt A' enters when the cover is shut into the frame A, and the nut B, when screwed down, forces the cover C tightly into and upon the gasket. In the cover C is embedded the glass D, properly secured by a water-tight joint, $d$, and the ring E. The interior of the frame A is made conical, as represented in the drawings. A wide recess, $b$, is formed all around the inside of the frame, about one-eighth of an inch in depth. In this recess is embedded a ring of india-rubber, $c$, having its section swelled, as shown in Fig. 3, so that when the cover C is closed down within the frame it will press upon the india-rubber $c$ and form a water-tight joint, and the rubber will serve also as an elastic cushion for the cover, holding so rigid a material as glass. From the conical form of the opening and the corresponding shape of the cover and the convexity of the gasket a perfect and yet elastic joint is made.

It is well known that india-rubber in time by constant compression in small surfaces becomes hard and inelastic. Such is the case where the gasket of rubber is usually applied to the flange on its face, outside of the opening, and beads of narrow edge are forced into the gasket, and the gasket soon loses its elasticity. In some cases the conical surfaces are ground together to form a water-tight joint. In such cases, whenever there is motion or strain in the frame of the ship, the glass must be broken. By my device and the arrangement of the convexity of the gasket there is elasticity and play enough to prevent breakage.

I claim—

In side or deck lights for vessels, the frame A, having within it the annular conical recess $b$, an annular india-rubber gasket, $c$, fitted therein, and the hinged cover C, having its periphery conformed to the conical opening of the frame A, substantially as and for the purpose described.

In testimony that I claim the foregoing as my own I hereto affix my signature in presence of two witnesses.

WM. H. DOUGLAS.

Witnesses:
HENRY D. PFEIL,
GEORGE W. CLARK.